United States Patent
Hladik, Jr.

(10) Patent No.: US 7,089,261 B2
(45) Date of Patent: Aug. 8, 2006

(54) PROGRAMMABLE USE OF DATA EXTRACTED FROM COMMON PRESENTATION FILES

(75) Inventor: William J. Hladik, Jr., Harrisburg, NC (US)

(73) Assignee: International Business Machines Corporation, Armonk, NY (US)

(*) Notice: Subject to any disclaimer, the term of this patent is extended or adjusted under 35 U.S.C. 154(b) by 186 days.

(21) Appl. No.: 10/202,933

(22) Filed: Jul. 25, 2002

(65) Prior Publication Data

US 2004/0019590 A1    Jan. 29, 2004

(51) Int. Cl.
*G06F 17/00* (2006.01)

(52) U.S. Cl. .................. 707/102; 707/101; 345/440

(58) Field of Classification Search ............. 707/104.1, 707/102, 100, 1, 101; 715/500; 345/440
See application file for complete search history.

(56) References Cited

U.S. PATENT DOCUMENTS

| | | | |
|---|---|---|---|
| 2,994,863 A | 8/1961 | Trapnell, Jr. ............... | 382/113 |
| 3,165,730 A | 1/1965 | Robinson ................... | 382/113 |
| 3,251,055 A | 5/1966 | McIntosh, Jr. et al. ..... | 382/113 |
| 3,253,273 A | 5/1966 | Allen et al. ................. | 382/113 |
| 3,335,408 A | 8/1967 | Oliver ........................ | 235/429 |
| 3,536,895 A | 10/1970 | Dedden et al. ............. | 382/207 |
| 3,555,244 A | 1/1971 | Spauszus et al. ........... | 382/113 |
| 3,671,961 A | 6/1972 | Lindley et al. ............. | 382/113 |
| 4,611,306 A | 9/1986 | Crehan et al. .............. | 345/810 |
| 4,644,367 A | 2/1987 | Onoda et al. ............... | 346/33 R |
| 4,674,042 A | 6/1987 | Hernandez et al. ......... | 715/503 |
| 4,800,510 A | 1/1989 | Vinberg et al. ............. | 345/440 |
| 4,815,029 A | 3/1989 | Barker et al. ............... | 715/516 |
| 4,852,019 A | 7/1989 | Vinberg et al. ............. | 345/440 |
| 4,933,880 A | 6/1990 | Borgendale et al. ........ | 715/515 |
| 5,291,561 A | 3/1994 | Tanaka et al. .............. | 382/113 |
| 5,317,650 A | 5/1994 | Harrington ................. | 382/199 |
| 5,392,130 A | 2/1995 | Mahoney .................... | 358/400 |
| 5,404,435 A | 4/1995 | Rosenbaum ................ | 715/515 |
| 5,416,895 A | 5/1995 | Anderson et al. ........... | 715/503 |
| 5,461,708 A | 10/1995 | Kahn .......................... | 345/440 |
| 5,513,271 A | 4/1996 | Rao et al. ................... | 382/113 |
| 5,619,631 A | 4/1997 | Schott ........................ | 345/440 |
| 5,926,623 A * | 7/1999 | Tsukakoshi et al. ........ | 709/200 |
| 6,026,416 A | 2/2000 | Kanerva et al. ............ | 715/515 |
| 6,144,766 A | 11/2000 | Okayasu ..................... | 382/203 |
| 6,320,586 B1 | 11/2001 | Plattner et al. ............. | 345/700 |

(Continued)

OTHER PUBLICATIONS

Parodi et al., Document Storage and Retrieval in Neural Database, Database and Expert Systems Applications, 1999. Proceedings. Tenth International Workshop on, Sep. 1-3, 1999, pp. 598-602.*

(Continued)

*Primary Examiner*—Greta Robinson
(74) *Attorney, Agent, or Firm*—James Palmer; Hoffman, Warnick & D'Alessandro LLC (57) ABSTRACT

A system and method of retrieving a target set of data from a presentation file. The system comprises: an extractor that extracts data elements from the presentation file, associates a unique identifier to each data element, and stores each data element and associated identifier in an extraction object; and a formatter that selects the target set of the data from the extraction object based on a set of references in a target object. Each reference conforms to a predefined set of rules that allow, for instance, data elements to be addressed by page, object, row and column.

12 Claims, 5 Drawing Sheets

U.S. PATENT DOCUMENTS

| | | | | |
|---|---|---|---|---|
| 6,339,775 B1 * | 1/2002 | Zamanian et al. | .......... | 707/101 |
| 6,611,838 B1 * | 8/2003 | Ignat et al. | .................. | 707/101 |
| 6,792,431 B1 * | 9/2004 | Tamboli et al. | ............. | 707/102 |
| 2001/0049695 A1 | 12/2001 | Chi et al. | .................... | 707/201 |
| 2006/0048058 A1 * | 3/2006 | O'Neal et al. | .............. | 715/730 |

OTHER PUBLICATIONS

"Set of algorithms for defining, querying, and undefining a group of non-text objects which are associated as an unbinding set of non-text objects," IBM Technical Disclosure Bulletin, vol. 30, No. 8, Jan. 1988, p. 123-127.

"Technique of retaining, saving and retrieving "imported group name," relationship between a related group of non-text objects in a document," IBM Technical Disclosure Bulletin, vol. 30, No. 8, Jan. 1988, p. 163-164.

"Method for supporting non-text objects in an index structure that originally supported only text records," IBM Technical Disclosure Bulletin, vol. 30, No. 8, Jan. 1988, p. 155-162.

"Advanced function printing presentation of human-readable data along with multiple-up data pages," IBM Technical Disclosure Bulletin, vol. 36, No. 11, Nov. 1993, p. 573-576.

* cited by examiner

|       | JAN | FEB | MAR | APR | MAY | JUN | JUL | AUG | SEP | OCT | NOV | DEC |
|-------|-----|-----|-----|-----|-----|-----|-----|-----|-----|-----|-----|-----|
| NORTH | 10  | 12  | 11  | 10  | 12  | 11  | 13  | 10  | 12  | 11  | 13  | 13  |
| SOUTH | 9   | 10  | 12  | 9   | 10  | 12  | 14  | 9   | 10  | 12  | 14  | 14  |
| EAST  | 20  | 6   | 7   | 20  | 6   | 7   | 11  | 20  | 6   | 7   | 11  | 11  |
| WEST  | 15  | 8   | 12  | 15  | 8   | 12  | 10  | 15  | 6   | 12  | 10  | 10  |

*FIG. 3*

| REFERENCE | RESOLVED | COMMENT | MISCELLANEOUS |
|---|---|---|---|
| >3~1 | #PN# #ON# #RN# #CN#S | SET PAGE AT 3, OBJ 1 | PAGE TITLE: #PT# |
|  | #PN# #ON# #RN# #CN#S | OBJECT TITLE, PG 1 REMEMBERED | OBJECT TITLE: #OT# |
| 3~1~1~1 | #PN# #ON# #RN# #CN#S | ROW & COL NOT SET YET | ROW/COL: #RT#/#CT# |
| >3~1~1~1 | #PN# #ON# #RN# #CN#S | CELL 1,1 ON PAGE 1, OBJ 1 | ROW/COL: #RT#/#CT# |
| >3~1~1~2 | #PN# #ON# #RN# #CN#S | NOTICE ">" - NO PRINT, BUT RESOLVE ANYWAY | ROW/COL: #RT#/#CT# |
| 1~2 | #PN# #ON# #RN# #CN#S | CHANGED TO CELL 1,2 | ROW/COL: #RT#/#CT# |
| 1~* | #PN# #ON# #RN# #CN#S | SHORTHAND FOR CELL 1,2, ASSUME LAST PG OBJ | PAGE TITLE: #PT# |
| 1~*~3 | #PN# #ON# #RN# #CN#S | FIRST ROW, LAST COL | ROW/COL: #RT#/#CT# |
| *~1 | #PN# #ON# #RN# #CN#S | FIRST ROW, 3RD FROM LAST COL | ROW/COL: #RT#/#CT# |
| *~1~1 | #PN# #ON# #RN# #CN#S | LAST ROW, FIRST COL | ROW/COL: #RT#/#CT# |
| *~1~*~1 | #PN# #ON# #RN# #CN#S | NEXT TO LAST ROW, FIRST COL | ROW/COL: #RT#/#CT# |
| *2~1~1 | #PN# #ON# #RN# #CN#S | LAST PAGE, CELL 1,1 | ROW/COL: #RT#/#CT# |
| 3~*~1~1 | #PN# #ON# #RN# #CN#S | 2ND FROM LAST PAGE, OBJ 1, CELL 1,1 | ROW/COL: #RT#/#CT# |
| 3~*1~1~1 | #PN# #ON# #RN# #CN#S | PAGE 3, LAST OBJ, CELL 1,1 | ROW/COL: #RT#/#CT# |
| PDP: TOWER INTERLOCK, CLAIM & ONBOARD GRAPH~1~1~1 | #PN# #ON# #RN# #CN#S | PAGE W/ THAT TITLE, OBJ 1, CELL 1,1 | ROW/COL: #RT#/#CT# |
| >PDP: TOWER INTERLOCK, CLAIM & ONBOARD GRAPH~PDP | #PN# #ON# #RN# #CN#S | SAME PAGE, OBJECT TITLED PDP, SET POINTER | ROW/COL: #RT#/#CT# |
| ONBOARD~MAY 01 | #PN# #ON# #RN# #CN#S | FROM LAST REMEMBERED PAGE, OBJ - CELL ONBOARD, MAY 01 | ROW/COL: #RT#/#CT# |
| INTERLOCK~* | #PN# #ON# #RN# #CN#S | LAST COLUMN OF INTERLOCK ROW | ROW/COL: #RT#/#CT# |
| CLAIM~5 | #PN# #ON# #RN# #CN#S | 5TH COLUMN OF CLAIM ROW | ROW/COL: #RT#/#CT# |
| *~2~JUL 01 | #PN# #ON# #RN# #CN#S | 2ND FROM LAST ROW, JULY DATA | ROW/COL: #RT#/#CT# |
| CLAIM~5 | #LC# | LAST CELL SHOWN TO THE LEFT | ROW/COL: #RT#/#CT# |
| #DP# | #PN# #ON# #RN# #CN#S | LAST RESOLVED DATA POINT | ROW/COL: #RT#/#CT# |
| ONBOARD[1]~MAY 01 | #PN# #ON# #RN# #CN#S | INDEX REF TO FIRST ROW CALLED ONBOARD | ROW/COL: #RT#/#CT# |
| ONBOARD[*]~MAY 01 | #PN# #ON# #RN# #CN#S | SHOULD BE NOTHING - ERROR | ROW/COL: #RT#/#CT# |
| 7~1~[3]~YTD JAN FTE TOTALS | #PN# #ON# #RN# #CN#S | LOOKING FOR .309 | ROW/COL: #RT#/#CT# |
| 16~AVENTIS, GM SITE, PECO, RYDER, SEARS, UNUM[1]~2~6 | #PN# #ON# #RN# #CN#S | LOOKING FOR 6.71 | ROW/COL: #RT#/#CT# |
| 3~1~AVG(CLAIM)~1..* | #PN# #ON# #RN# #CN#S | AVG OF WHOLE CLAIM ROW | ROW/COL: #RT#/#CT# |
| 3~1~1..CLAIM~SUM(FEB 01) | #PN# #ON# #RN# #CN#S | SUM OF FEB 01 COLUMN | ROW/COL: #RT#/#CT# |
| 3~1~INTERLOCK, ONBOARD~SUB(DEC 01) | #PN# #ON# #RN# #CN#S | SUBTRACT ONBOARD FROM INTERLOCK FOR DEC 01 | ROW/COL: #RT#/#CT# |

FIG. 4

| REFERENCE | RESOLVED | COMMENT | MISCELLANEOUS |
|---|---|---|---|
| | | SET PAGE AT 3, OBJ 1 | PAGE TITLE: ALL J1K: INTERLOCK v. ONBOARD & CLAIM |
| | 3.1.1.1 | OBJECT TITLE, PG 1 REMEMBERED | OBJECT TITLE: ALL J1K |
| | 3.1.1.1 | ROW & COL NOT SET YET | ROW/COL: INTERLOCK/FEB 01 |
| 180.54 | 3.1.1.1 | CELL 1.1 ON PAGE 1, OBJ 1 | ROW/COL: INTERLOCK/FEB 01 |
| | 3.1.1.1 | NOTICE ">" - NO PRINT, BUT RESOLVE ANYWAY | ROW/COL: INTERLOCK/FEB 01 |
| | 3.1.1.2 | CHANGED TO CELL 1.2 | ROW/COL: INTERLOCK/FEB 01 |
| 184.04 | 3.1.1.2 | SHORTHAND FOR CELL 1.2, ASSUME LAST PG OBJ | PAGE TITLE: ALL J1K: INTERLOCK v. ONBOARD & CLAIM |
| 176.75 | 3.1.1.12 | FIRST ROW, LAST COL | ROW/COL: INTERLOCK/JAN 02 |
| 180.33 | 3.1.1.9 | FIRST ROW, 3RD FROM LAST COL | ROW/COL: INTERLOCK/OCT 01 |
| 168.81 | 3.1.3.1 | LAST ROW, FIRST COL | ROW/COL: CLAIM/FEB 01 |
| 168 | 3.1.2.1 | NEXT TO LAST ROW, FIRST COL | ROW/COL: ONBOARD/FEB 01 |
| 0.018 | 4.1.1.1 | LAST PAGE, OBJ 1, CELL 1.1 | ROW/COL: DEFECTS/FEB 01 |
| 848 | 2.1.1.1 | 2ND FROM LAST PAGE, OBJ 1, CELL 1.1 | ROW/COL: PERCENT MET CYCLE TIME/FEB 01 |
| | 3.2.1.1 | PAGE 3, LAST OBJ, CELL 1.1 | ROW/COL: / |
| 180.54 | 3.1.1.1 | PAGE 3, NEXT TO LAST OBJ, CELL 1.1 | ROW: COL: INTERLOCK/FEB 01 |
| 48.07 | 4.1.1.1 | PAGE W/ THAT TITLE, OBJ 1, CELL 1.1 | ROW: COL: INTERLOCK/FEB 01 |
| | 4.1.1.1 | SAME PAGE, OBJECT TITLED PDP, SET POINTER | ROW: COL: INTERLOCK/FEB 01 |
| 46 | 4.1.2.4 | FROM LAST REMEMBERED PAGE, OBJ - CELL ONBOARD, MAY 01 | ROW/COL: ONBOARD/MAY 01 |
| 45.56 | 4.1.1.12 | LAST COLUMN OF INTERLOCK ROW | ROW/COL: INTERLOCK/JAN 02 |
| 43.36 | 4.1.3.5 | 5TH COLUMN OF INTERLOCK ROW | ROW/COL: CLAIM/JUN 01 |
| 48.07 | 4.1.1.6 | 2ND FROM LAST ROW, JULY DATA | ROW/COL: INTERLOCK/JUL 01 |
| 43.36 | 43.36 | LAST CELL SHOWN TO THE LEFT | ROW/COL: CLAIM/JUN 01 |
| 43.36 | 4.1.3.5 | LAST RESOLVED DATA POINT | ROW/COL: CLAIM/JUN 01 |
| 46 | 4.1.2.4 | INDEX REF TO FIRST ROW CALLED ONBOARD | ROW/COL: ONBOARD/MAY 01 |
| @ERR | 4.1.2.4 | SHOULD BE NOTHING - ERROR | ROW/COL: ONBOARD/MAY 01 |
| 0.309 | 7.1.4.8 | LOOKING FOR .309 | ROW/COL: _/YTD JAN. FTE TOTALS |
| 6.711 | 6.1.2.6 | LOOKING FOR 6.71 | ROW/COL: IMAGES SUPPORTED PER FTE/JAN |
| 169.363 | 3.1.3.* | AVG OF WHOLE CLAIM ROW | ROW/COL: CLAIM/* |
| 517.35 | 3.1.*.1 | SUM OF FEB 01 COLUMN | ROW/COL: */FEB 01 |
| 15.97 | 3.1.*.11 | SUBTRACT ONBOARD FROM INTERLOCK FOR DEC 01 | ROW/COL: */DEC 01 |

FIG. 5

PROGRAMMABLE USE OF DATA EXTRACTED FROM COMMON PRESENTATION FILES

BACKGROUND OF THE INVENTION

1. Technical Field

The present invention relates generally to data processing, and more specifically relates to a system and method of extracting data from presentation files so that the data can be utilized for a different purpose.

2. Related Art

Computer generated presentations, such as those generated using LOTUS FREELANCE™, MICROSOFT POWERPOINT™ or COREL PRESENTATIONS™ software, have become an indispensable toot for communicating information in today's fast pace business environment. Presentation software provides a simple interface that allows business information, concepts, or other data to be manipulated and presented in a manner that is easily understood and digested by the viewers. Using the software, presentations containing charts, tables and graphs can be displayed on a computer screen for small audiences, or on an overhead projection system for larger audiences. Given their overall simplicity and effectiveness, computer generated presentations have become a standard for reporting business data.

In some cases, presentations are only shown a handful of times and then archived never to be seen again. In other cases, "structured presentations" that maintain a predefined format are used on a recurring basis. For instance, structured presentations that convey monthly measurement data may maintain their structure and format from month to month, but include data or other content that changes each month. In both instances, it may be desirable to capture the presented data and further process it in a separate application.

Unfortunately, while most of the data used in presentations may be based on existing databases of information, the presented data is often integrated, tailored or embellished for a specific purpose and therefore does not separately exist. For instance, raw data may be aggregated, tweaked, or even spun in such a way that adds value to the data for a sales meeting. Accordingly, because the presented data only exists in the created presentation files, electronic access to the data for any useful purpose beyond the presentation itself does not exist.

U.S. Pat. No. 4,852,019, "Method and System for Retrieval of Stored Graphs," issued to Vinberg et al., describes a system for retrieving stored graphical images and charts, and is hereby incorporated by reference. However, the reference does not teach retrieving and cataloging the actual data that may be displayed in the chart or graph. Accordingly, a need exists for a system that can easily access data from a presentation file.

SUMMARY OF THE INVENTION

The present invention addresses the above-mentioned problems, as well as others, by providing a system and method that can retrieve and process a target set of data from a presentation file based on a set of references provided by an end-user. In a first aspect, the invention provides a system for retrieving a target set of data from a presentation file, comprising: an extractor that extracts data elements from the presentation file, associates a unique identifier to each data element, and stores each data element and associated identifier in an extraction object; and a formatter that selects the target set of the data from the extraction object based on a set of references in a target object.

In a second aspect, the invention provides a method of generating a target set of data from a presentation file, comprising: extracting a plurality of data elements from the presentation file; associating a unique identifier to each data element; storing each data element and associated identifier in an extraction object; storing references in a target object that refer to targeted data elements; matching the references in the target object with data elements in the extraction object; and outputting the matched data elements.

In a third aspect, the invention provides a program product stored on a recordable medium for generating a targeted set of data from a presentation file, comprising: means for extracting a plurality of data elements from the presentation file, associating a unique identifier to each data element, and storing each data element and associated identifier in an extraction object; means for storing references in a target object, wherein each reference refers to a targeted data element; means for matching the references in the target object with data elements in the extraction object; and means for outputting the matched data elements in a predetermined format.

BRIEF DESCRIPTION OF THE DRAWINGS

The embodiments of this invention will be described in detail, with reference to the following figures, wherein like designations denote like elements, and wherein:

FIG. 4 depicts a target object in accordance with the invention.

FIG. 5 depicts a formatted target data output in accordance with the invention.

DETAILED DESCRIPTION OF THE INVENTION

Overview

Figure 2:
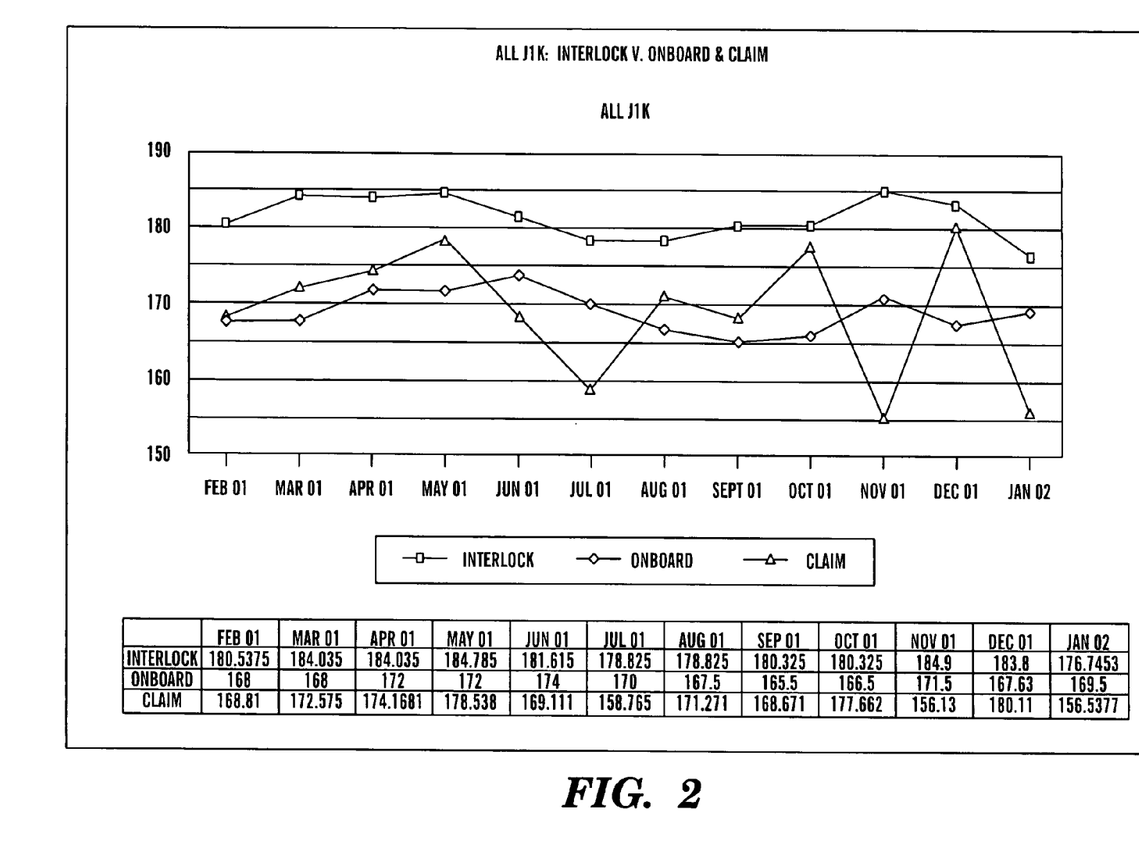
FIG. 2 depicts an exemplary graph and chart from a presentation file in accordance with the invention.

The invention describes a process/tool to automatically "walk through" navigate each page in a presentation file looking for data objects, such as charts and tables. For instance, FIG. 2 depicts an exemplary set of data objects comprising a matching chart and table. The raw data points or data elements that went into that chart or table are extracted and placed into an extraction object, e.g., an intermediate output file, which maintains a known file format. Then, a user can describe data targets, i.e., the data elements that they are interested in using, e.g., "the data point for February's Revenue on the chart entitled 'YTD Revenue' found in the 3rd chart that appears on the page entitled 'Revenue Status.'" Each data target is stored as a "reference" that conforms to a predefined set of rules. After all desired references are provided, a formatter reads the extraction object, matches each reference to a data element in extraction object, and formats a final output of the matched elements according to the user's specifications.

EXEMPLARY EMBODIMENTS

Figure 1:
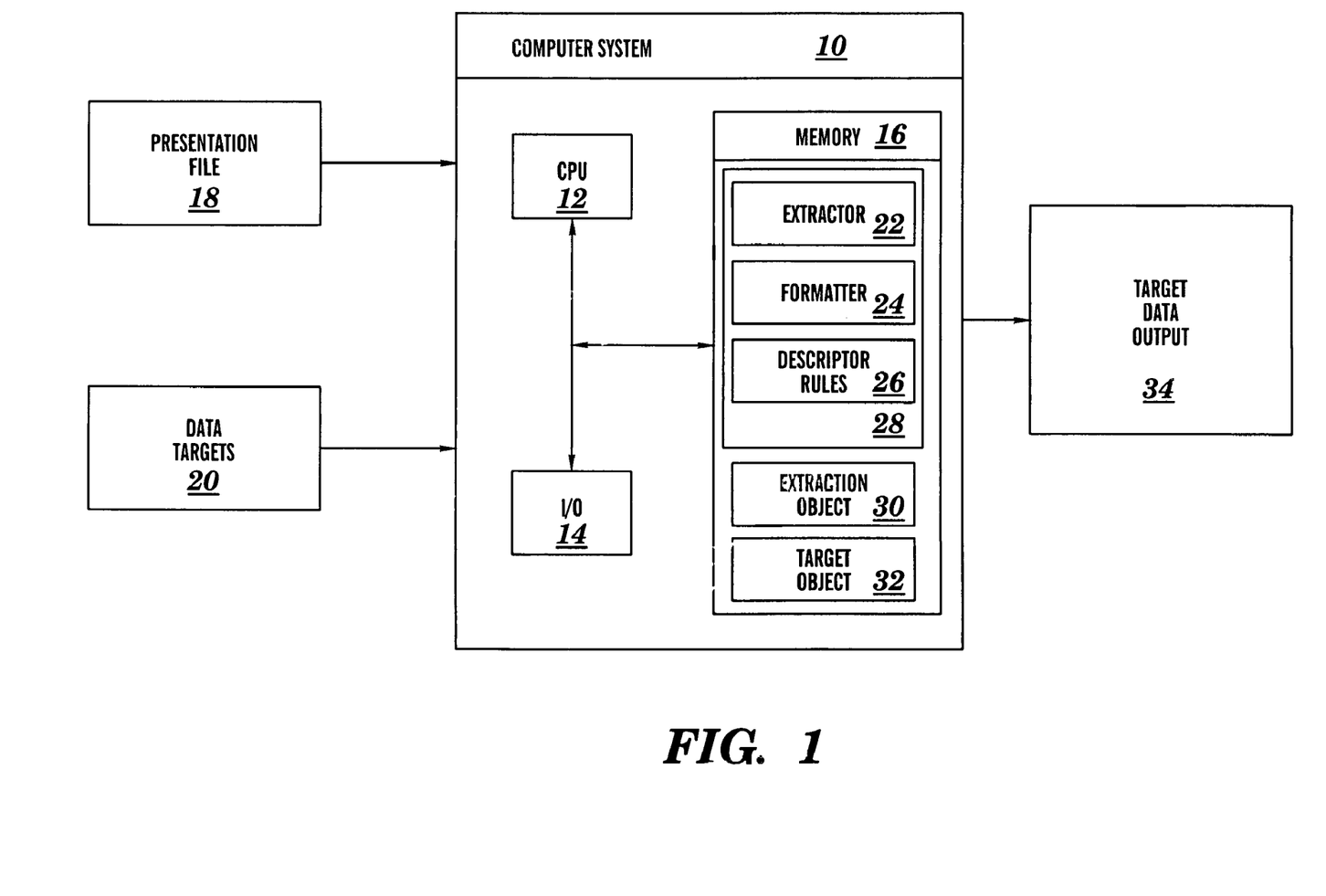
FIG. 1 depicts a computer system for processing a presentation file in accordance with the invention.

Referring now to the drawings, FIG. 1 depicts a computer system 10 for implementing the invention. Computer system 10 reads in: (1) a presentation file 18, such as those generated by LOTUS FREELANCE™, MICROSOFT POWERPOINT™ or COREL PRESENTATIONS™ software; and (2) data targets 20, and outputs a target data output 34. The computer system 10 generally comprises memory 16, input/output interfaces 14, and a processing unit (CPU) 12. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms. CPU 12 may likewise comprise a single processing unit, or be distributed across one or more processing units in one or more locations, e.g., on a client and computer.

I/O interfaces 14 may comprise any system for exchanging information from an external source, including a CRT, LED screen, hand held device, keyboard, mouse, voice recognition system, speech output system, printer, facsimile, pager, personal digital assistant, etc. In addition, although not shown, additional components, such as cache memory, communication systems, system software, etc., may be incorporated into computer system 10.

Stored in memory 16 is a software system 28 that includes an extractor 22, a formatter 24, and a set of descriptor rules 26. Extractor 22 reads in the presentation file 12, extracts data elements, associates an identifier with each data element, and stores the data elements/identifiers in extraction object 30. The formatter 24 determines which of the data elements will be in the final output based on the inputted data targets 20. Descriptor rules 26 determine the input format of the data targets 20 that can be interpreted by formatter 24. In this embodiment, each data target is stored as a reference that conforms to the descriptor rules 26, in a target object 32. In one possible embodiment, the data targets 20 are stored as formatted entries in a spreadsheet. In another embodiment, the software system 28 could automatically generate a target object 32 based on data targets 20 entered into a dialog window via a graphical user interface. Formatter 24 processes both the presentation file 18 and the target object 32 to select data elements in the extraction object 30 that match references in the target object 32. Formatter 24 may then generated a target data output 34 formatted in a predetermined manner. Details of each of these operations are described in further detail below.

As noted, FIG. 2 depicts an exemplary chart and table from a presentation file. Data objects, such as charts and tables often hold numeric data, and tend to share common characteristics such as having rows and columns. Most charts, even if they are formatted as pie charts, bar charts, or any type of chart, have a row and column characteristic. The rows are usually the items being charted (i.e., Revenue, Sales, Expenses—things along the Y-axis having a numeric property and generally the things appearing in the legend of the chart). The columns are usually the groupings for data being charted (i.e., Time periods, Districts, etc.—things along X-axis). Notice in the chart of FIG. 2 that ("Interlock" and "Onboard") are examples of rows and ("Feb 01" and "Mar 01") are examples of columns. This matches the way the table below the chart is laid out. Since all Charts and Tables can be captured as two dimensional grids, any cell in that grid can be addressed by referring to its row header and its column header. An example is "Onboard/Jan 02," which has the value 169.5. This may also be referred to as 2/12 (2nd row, 12th column).

As noted, extractor 22 reads in a presentation file 18, extracts all of its data elements, and creates an extraction object 30. Data elements may include raw data, headings, element names, and any other needed information. Extractor 22 may be implemented, for instance, in a software program written in LOTUSSCRIPT™ that is designed to read through a LOTUS FREELANCE™ presentation file and create as output an extraction file. Such a script or program could easily be written by one skilled in the art.

An exemplary portion of an extraction output object is shown below for the exemplary Chart and Table of FIG. 2.

"Page: 3"
"Object1: Chart1: All JIK"
"Data: 3~1~1~1 Interlock~Feb 01=180.54"
"Data: 3~1~1~2 Interlock~Mar 01=184.04"
"Data: 3~1~1~3 Interlock~Apr 01=184.04"
"Data: 3~1~1~4 Interlock~May 1=184.79"
"Data: 3~1~1~5 Interlock~Jun 01=181.62"
"Data: 3~1~1~6 Interlock~Jul 01=178.83"
"Data: 3~1~1~7 Interlock~Aug 01=178.83"
"Data: 3~1~1~8 Interlock~Sept 01=180.33"
"Data: 3~1~1~9 Interlock~Oct 01=180.33"
"Data: 3~1~1~10 Interlock~Nov 01=184.90"
"Data: 3~1~1~11 Interlock~Dec 01=183.80"
"Data: 3~1~1~12 Interlock~Jan 02=176.75"
"Data: 3~1~2~1 Onboard~Feb 01=168.00"
"Data: 3~1~2~2 Onboard~Mar 01=168.00"
"Data: 3~1~2~3 Onboard~Apr 01=172.00"
"Data: 3~1~2~4 Onboard~May 1=172.00"
"Data: 3~1~2~5 Onboard~Jun 01=174.00"
"Data: 3~1~2~6 Onboard~Jul 01=170.00"
"Data: 3~1~2~7 Onboard~Aug 01=167.50"
"Data: 3~1~2~8 Onboard~Sept 01=165.50"
"Data: 3~1~2~9 Onboard~Oct 01=166.50"
"Data: 3~1~2~10 Onboard~Nov 01=171.50"
"Data: 3~1~2~11 Onboard~Dec 01=167.83"
"Data: 3~1~2~12 Onboard~Jan 02=169.50"
"Data: 3~1~3~1 Claim~Feb 01=168.81"
"Data: 3~1~3~2 Claim~Mar 01=172.58"
"Data: 3~1~3~3 Claim~Apr 01=174.17"
"Data: 3~1~3~4 Claim~May 1=178.54"
"Data: 3~1~3~5 Claim~Jun 01=169.11"
"Data: 3~1~3~6 Claim~Jul 01=158.77"
"Data: 3~1~3~7 Claim~Aug 01=171.27"
"Data: 3~1~3~8 Claim~Sept 01=168.67"
"Data: 3~1~3~9 Claim~Oct 01=177.66"
"Data: 3~1~3~10 Claim~Nov 01=156.13"
"Data: 3~1~3~11 Claim~Dec 01=180.11"
"Data: 3~1~3~12 Claim~Jan 02=156.54"
"Object2: Table1:"
"Data: 3~2~1~1~="
"Data: 3~2~1~2 Feb 01=Feb 01"
"Data: 3~2~1~3 Mar 01=Mar 01"
"Data: 3~2~1~4 Apr 01=Apr 01"
"Data: 3~2~1~5 May 1=May 1"
"Data: 3~2~1~6 Jun 01=Jun 01"
"Data: 3~2~1~7 Jul 01=Jul 01"
"Data: 3~2~1~8 Aug 01=Aug 01"
"Data: 3~2~1~9 Sep 01=Sep 01"
"Data: 3~2~1~10 Oct 01=Oct 01"
"Data: 3~2~1~11 Nov 01=Nov 01"
"Data: 3~2~1~12 Dec 01=Dec 01"
"Data: 3~2~1~13 Jan 02=Jan 02"
"Data: 3~2~2~1 Interlock~=Interlock"

"Data: 3~2~2~2 Interlock~Feb 01=180.5375"
"Data: 3~2~2~3 Interlock~Mar 01=184.035"
"Data: 3~2~2~4 Interlock~Apr 01=184.035"
"Data: 3~2~2~5 Interlock~May 01=184.785"
"Data: 3~2~2~6 Interlock~Jun 01=181.615"
"Data: 3~2~2~7 Interlock~Jul 01=178.825"
"Data: 3~2~2~8 Interlock~Aug 01=178.825"
"Data: 3~2~2~9 Interlock~Sep 01=180.325"
"Data: 3~2~2~10 Interlock~Oct 01=180.325"
"Data: 3~2~2~11 Interlock~Nov 01=184.9"
"Data: 3~2~2~12 Interlock~Dec 01=183.8"
"Data: 3~2~2~13 Interlock~Jan 02=176.7453"
"Data: 3~2~3~1 Onboard~=Onboard"
"Data: 3~2~3~2 Onboard~Feb 01=168"
"Data: 3~2~3~3 Onboard~Mar 01=168"
"Data: 3~2~3~4 Onboard~Apr 01=172"
"Data: 3~2~3~5 Onboard~May 1=172"
"Data: 3~2~3~6 Onboard~Jun 01=174"
"Data: 3~2~3~7 Onboard~Jul 01=170"
"Data: 3~2~3~8 Onboard~Aug 01=167.5"
"Data: 3~2~3~9 Onboard~Sep 01=165.5"
"Data: 3~2~3~10 Onboard~Oct 01=166.5"
"Data: 3~2~3~11 Onboard~Nov 01=171.5"
"Data: 3~2~3~12 Onboard~Dec 01=167.63"
"Data: 3~2~3~13 Onboard~Jan 02=169.5"
"Data: 3~2~4~1 Claim~=Claim"
"Data: 3~2~4~2 Claim~Feb 01=168.81"
"Data: 3~2~4~3 Claim~Mar 01=172.575"
"Data: 3~2~4~4 Claim~Apr 01=174.1681"
"Data: 3~2~4~5 Claim~May 1=178.538"
"Data: 3~2~4~6 Claim~Jun 01=169.111"
"Data: 3~2~4~7 Claim~Jul 01=158.765"
"Data: 3~2~4~8 Claim~Aug 01=171.271"
"Data: 3~2~4~9 Claim~Sep 01=168.671"
"Data: 3~2~4~10 Claim~Oct 01=177.662"
"Data: 3~2~4~11 Claim~Nov 01=156.13"
"Data: 3~2~4~12 Claim~Dec 01=180.11"
"Data: 3~2~4~13 Claim~Jan 02=156.5377"
"PageTitle: All J1K: Interlock v. Onboard & CLAIM"

Entries in the extraction object include the actual data, e.g., "Claim~May 1=178.54" as well as an associated identifier, e.g., "3~1~3~4." In this example, the identifier is a series of numbers that identify the page (i.e., 3), the object on the page (i.e., 1), the row (i.e., 3), and the column (i.e., 4). Other entries may simply include page titles, page numbers, object identifiers, etc.

In addition to the extraction object 30 being generated, an end user can select data targets 20 from the presentation that are to be included in the target data output 34. The data targets 20 are stored as references in a target object 32, which conform to the descriptor rules 26. The target object 32 can be implemented using any process, file type, or tool. In one example, the target object 32 may comprise a spreadsheet where each cell in the spreadsheet contains a possible reference to a data element in the presentation using the conventions described below. In this case, the user filling out the spreadsheet would need to ensure that each reference conformed to the set of descriptor rules 26. In another example, the target object 32 is automatically created in conformance with the descriptor rules 26 based on input provided by a user, e.g., via a GUI. Once created, the formatter 24 examines the references in the target object 32 and matches them to the actual content found in the extraction object 30.

In one embodiment, the descriptor rules 26 allow for any data element in a presentation to be addressed using a 4 level reference, which includes:

(1) The page on which the data point exists;
(2) The data object (chart or table) on that page on which the data point exists;
(3) The row on that data object on which the data point exists; and
(4) The column on that data object on which the data point exists.

In this case, the "~" symbol is used as a delimiter to identify each level of a reference, e.g., "Page~Object~Row~Column." Thus, 5~2~7~3 might refer to the 5th page, 2nd object on that page, data point at row 7 and column 3.

In addition, the descriptor rules 26 allow named equivalents for each numeric reference described above to be addressed. For example, the page in the presentation might have a title. Some presentation file formats uniquely identify a text object for "page title," which the presentation owner may or may not have used. The invention recognizes that humans regard the largest text, nearest to the top of the page as a "page title" whether the owner designated it as such or not. Lacking any understandable page title, the rules may assign a page title of "_" to a page (meaning blank).

The descriptor rules 26 allow for a name or a number to be used when referring to pages in a presentation. If page 5 was titled "1Q02 Revenue," the example data point reference could comprise "1Q02 Revenue~2~7~3." The rules also conceive of multiple pages in a presentation having the exact same page title and allows for them to be referenced using an index like notation such as: "1Q02 Revenue[3]," meaning the 3rd instance of a page with a page title of "1Q02 Revenue." The data point reference could be referred to therefore as "1 Q02 Revenue[3]~2~7~3." The rules conceive of possible confusion in that a page may be titled with a text string of "5" for example. To distinguish between numerical page 5 and the page entitled "5," a notation of "=5" is allowed. Thus, "5~2~7~3" would refer to page 5, object 2, row 7, column 3 and "=5~2~7~3" would refer to the page with title "5", object 2, row 7, column 3.

Similarly, a data object (chart or table) in the presentation might have a title. Some presentation file formats uniquely identify a text object for "chart title." The presentation owner may or may not have used this. The invention recognizes that humans regard the largest text, nearest to the top of the object as the "object title" whether the owner designated it as such or not. Lacking any understandable object title, the rules assign a title of "_" to an object (meaning blank). Moreover, the rules allow for a name or a number to be used when referring to objects in a presentation. If object 2 was titled "North," the example data point reference could be "5~North~7~3." The invention also conceives of multiple objects on a page in a presentation having the exact same object title and allows for them to be referenced using an index like notation such as: "North[3]," which means the 3rd instance of an object (on page x) with a title of "North." In this case a data point reference might now become "5~North[3]~7~3." Also, the rules recognize a possible confusion in that an object may be titled with a text string of "2" for example. To distinguish between numerical object 2 and the object entitled "2," a notation of "=2" is allowed. For instance, "5~2~7~3" would refer to page 5, object 2, row 7, column 3 and "5~=2~7~3" would refer to page 5, the object with title "2," row 7, column 3.

The row in the object might also have a title. For Charts, as explained above, the row represents the Y-Axis numeric items being charted, which also appears in the legend. These data elements generally do have names. For Tables, the row title is the text found in the first cell on the row. Lacking any understandable row title, the rules assign a title of "_" to a row (meaning blank). The rules allow for a name or a number to be used when referring to rows on an object. Thus, if row 7 was titled "Sales," the example data point reference could have been: "5~2~Sales~3."

The rules also recognize that multiple rows on an object may have the exact same row title and allows for them to be referenced using an index like notation such as: "Sales[2]" meaning the 2nd instance of a row (on object x) with a title of "Sales." The data point reference could then become: "5~2~Sales[2]~3." The rules recognize possible confusion in that a row may be titled with a text string of "7" for example. To distinguish between numerical row 7 and the row entitled "7," a notation of "=7" is allowed. Thus, "5~2~7~3" would refer to page 5, object 2, row 7, column 3, while "5~2~=7~3" would refer to page 5, object 2, the row with title "7", column 3.

The column in the object might also have a title. For Charts, as explained above, the column represents the X axis grouping items being. They generally do have names. For Tables, the column title is the text found in the top cell in a column of the table. Lacking any understandable column title, the rules assign a title of "_" to a column (meaning blank). The rules allow for a name or a number to be used when referring to columns on an object. If column 3 was titled "March," an example data point reference could be "5~2~7~March." The rules also recognize that multiple columns on an object may have the exact same column title, and allows for them to be referenced using an index like notation such as: "March[2]," meaning the 2nd instance of a column (on object x) with a title of "March." The data element reference might then be "5~2~7~March[2]." The rules recognize possible confusion in that a column may be titled with a text string of "3," for example. To distinguish between numerical column 3 and the column entitled "3," a notation of "=3" is allowed. Thus, "5~2~7~3" would refer to page 5, object 2, row 7, column 3, while "5~2~7~=3" would refer to page 5, object 2, row 7, the column with title "3."

The descriptor rules 26 further recognize that positional equivalents are often useful in place of named equivalents. In place of page, object, row, or column, the invention allows for a reference to "*" meaning the last one. When extracting data from a structured presentation, especially when done on a recurring basis, it is often useful to refer to the last column for example. Perhaps the last column represents "March" during one month and "April" during the next month. If the task is to reference the most recent data, it is handy to refer to the last one, and thereby avoid having to modify the "rule set" each month. For example, "5~2~7~*" would address the last column on row 7 of object 2 on page 5.

Likewise, a notation of "*-n" may be used to refer to the nth from the last item. For example, "5~2~*-3~3" would mean page 5, object 2, 3rd from last row, column 3. The following table summarizes the above discussion on how one might reference a data point in a presentation. Each of these conventions may be used for any or all of a page, object, row, and column.

| Reference | Example | Description |
| --- | --- | --- |
| n | 5~2~3~6 | Reference to numeric nth index |
| text | 5~text~3~6 | Reference to textual name "text" |

-continued

| Reference | Example | Description |
| --- | --- | --- |
| text[n] | 5~2~text[3]~6 | Reference to nth occurrence of textual name "text" |
| =z | 5~2~3~=2001 | Reference to tectural name "z" which happens to be a number |
| =z[n] | 5~2~3~=44[5] | Reference to nth occurrence of textual name "z" which happens to be a number |
| _ | 5~_~3~6 | Reference to textual name of "blank" or "missing" |
| _[4] | 5~2~_[4]~6 | Reference to nth occurrence of textual name "blank" or "missing |
| * | 5~2~3~* | Reference to last numeric index |
| *-n | 5~2~*-2~6 | Reference to nth from last numeric index |

Figure 3:
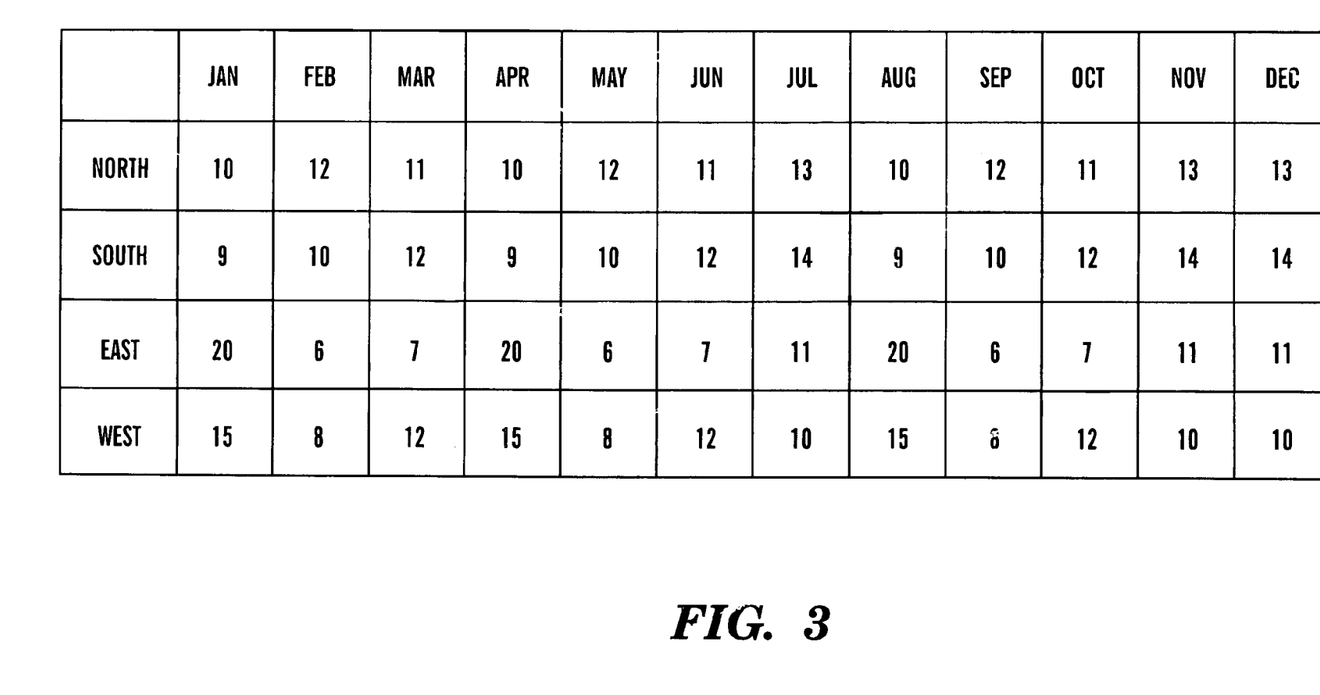
FIG. 3 depicts an exemplary chart from a presentation file in accordance with the invention.

In addition, it is often desirable to select not just a specific data point for inclusion in the output, but to select a calculated result based on several data points. For example, one may wish to load into an external output the average of all data points shown on a chart for the months of January through December. The rules provide additional math-based conventions when referencing the row and column portions of the data points. A two dimensional table is used to describe the invention. The data point addressing (4~2~1~6) has identified a specific object (table or chart) on a particular page (page 4, chart 2). That object can be thought of as a table with rows and columns such as that shown in FIG. 3.

Calculations may occur across rows or down columns. In order to perform a calculation a single row must be identified for example, and then the multiple columns to be included in the calculation. Or, done in the other direction, a single column must be identified and then the multiple rows to be considered in the calculation. Thus, rules may include spreadsheet like calculations over a range, defined to be multiple rows and multiple columns.

The rules may provide a specification with a row~column reference that takes one of these two forms:

Math(Row_ref)~Col_list—interpreted as "perform math across the row identified as 'row-ref' for the columns identified as 'col_list'"; or Row_List~Math(Col_ref)—interpreted as "perform math down the column identified as 'col-ref' for the rows identified as 'row_list'".

For the conventions Math(row_ref) or Math(col_ref), the following math conventions could be used, although others could be easily adapted.

SUM(reference)—add up or sum a number of data points

AVG(reference)—calculate an average of a number of data points

SUB(reference)—subtract a number of data points.

For the conventions Row_list or Col_list, the following conventions are examples of identifying row or column lists to be considered in carrying out the math calculation:

| | |
| --- | --- |
| Ref_start...Ref_end | all rows or columns from start to end. Each reference may take any of the forms summarized above in the addressability table. |
| Ref_1, ref_2, ref_3 ... ref_n | the rows or columns identified in this comma separated list of references. All rows/columns referenced by "ref_1" or "ref_2" and so on. Each reference may take any of the forms summarized above in the addressability table. |

The following row~col example references are provided:

| Example | Description |
|---|---|
| Avg(East)~Jan...Jun | Average of row east columns Jan through Jun |
| 1..*~Sum(Oct) | Sum the column Oct for the rows 1 through the last row |
| Sub(*-2)~*,*-1 | Subtract across the 2nd from last row (South), start with the last column (Dec) and subtract the next to last column (Nov) |
| Sub(South)~Dec,Nov | Same as the above example, but more readable |
| South, West,East·Sum(Feb) | Sum the Feb column for rows south, west, and east |
| 1...3~Avg(5) | Avg the 5th column (May) for rows 1 (North) through 3 (East) |
| North..East~Avg(May) | Same as the above eaxmple, but more readable |
| 2~Sum(10) | Sum the Oct column for row 2 (South) - Sum wasn't needed here; could just refer to 2~10 |
| West[*]~Sub(Mar) | Subtract down column Mar using all rows titled West. Notice the "West[*]" convention - a variation of [n] described earlier. It means all rows entitled "West." In this case there is only one row titled West and the net of the subtraction calculation is nothing. We could have change the whole ref to West~Mar and achieved the same result. |

The above examples just described the row~column portion of the data point address enhanced with math calculations. The full reference, including page and object are still needed.

Below are several examples of full references that use math calculations:

3~2~Sum(East)~5 . . . 9
First Page~First Object~3, 5, 7, 9~Avg(*)
*~*~Sum(1)~1, *,Mar, Jul Once a specific data point is identified, and by implication a specific object on a specific page is also identified, the rules also provide several special variables becoming available for use in formatting output records. The variables which can be referenced are:

PT#—The page title
PN#—The page number
OT#—The object title (by object we mean chart or table)
ON#—The object number (by object we mean chart or table)
RT#—The row title
RN#—The row number
CT#—The column title
CN#—The column number
DP#—Last data point resolved FIG. 4 depicts an exemplary target object 32. It is loaded with cells containing data references (primarily in column 1). It has special variable references in columns 2 and 4, and column 3 contains mostly text. The idea in this example is for the formatter 24 to resolve these references and replace the cell contents with the data element it obtained from the presentation. We would expect column 3 to be left alone as it contains plain text and not references or special variable references.

FIG. 5 depicts a target data output file based on the target object of FIG. 4. The formatter 24 examines each cell in the spreadsheet of FIG. 4 and replaces data point references, and special variable references with the data elements from the extraction object 30. Other cell content is left as is.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, software, or objects, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method of generating a target set of data from a presentation file, comprising:
    extracting a plurality of data elements from the presentation file;
    associating a unique identifier to each data element;
    storing each data element and the unique identifier associated with the data element in an extraction object;
    storing references in a target object that refer to targeted data elements;
    generating a target set of data using a formatter by matching the references in the target object with data elements in the extraction object; and
    outputting the matched data elements.

2. The method of claim 1, wherein each unique identifier identifies a page, a data object, a row, and a column.

3. The method of claim 1, wherein each reference conforms to a predetermined set of rules.

4. The method of claim 1, wherein the predetermined set of rules allows a reference to refer to a data element with a page number, object number, row number and column number.

5. The method of claim 4, wherein the predetermined set of rules allows a reference to comprise an addressing mechanism selected from the group consisting of: a page title, an object title, a row title, a column title, and a positional equivalent.

6. The method of claim 4, wherein the predetermined set of rules allows a reference to comprise a mathematical operator.

7. A program product stored on a recordable medium for generating a targeted set of data from a presentation file, comprising:
- means for extracting a plurality of data elements from the presentation file, associating a unique identifier to each data element, and storing each data element and the unique identifier associated with the data element in an extraction object;
- means for storing references in a target object, wherein each reference refers to a targeted data element;
- means for generating a target set of data by matching the references in the target object with data elements in the extraction object; and
- means for outputting the matched data elements in a predetermined format.

8. The program product of claim 7, wherein the each unique identifier identifies a page, a data object, a row, and a column.

9. The program product of claim 7, wherein each reference conforms to a predetermined set of rules.

10. The program product of claim 9, wherein the predetermined set of rules allows a reference to refer to a data element wit a page number, object number, row number and column number.

11. The program product of claim 9, wherein the predetermined set of rules allows a reference to comprise an addressing mechanism selected from the group consisting of: a page title, an object title, a row title, a column title, and a positional equivalent.

12. The program product of claim 9, wherein the predetermined set of rules allows a reference to comprise a mathematical operator.

* * * * *

UNITED STATES PATENT AND TRADEMARK OFFICE
CERTIFICATE OF CORRECTION

| | | |
|---|---|---|
| PATENT NO. | : 7,089,261 B2 | Page 1 of 1 |
| APPLICATION NO. | : 10/202933 | |
| DATED | : August 8, 2006 | |
| INVENTOR(S) | : William J. Hladik, Jr. | |

It is certified that error appears in the above-identified patent and that said Letters Patent is hereby corrected as shown below:

Column 2, line 50, please insert --or-- prior to the word "navigate".

Claim 10, column 12, line 5, please remove "wit" and insert --with--.

Signed and Sealed this

Twenty-eighth Day of November, 2006

JON W. DUDAS
*Director of the United States Patent and Trademark Office*